(12) United States Patent
Konno et al.

(10) Patent No.: US 6,435,264 B1
(45) Date of Patent: Aug. 20, 2002

(54) COOLING SYSTEM FOR WORKING VEHICLE

(75) Inventors: Osahiro Konno; Kazuyuki Sagara; Yutaka Tanaka, all of Kawagoe (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/377,062

(22) Filed: Aug. 19, 1999

(30) Foreign Application Priority Data

Aug. 21, 1998 (JP) .......................................... 10-252014

(51) Int. Cl.⁷ .......................... B60K 11/00; B60K 11/04
(52) U.S. Cl. ............................ 165/41; 165/51; 165/149; 180/68.1; 180/68.4; 123/41.49; 123/41.51
(58) Field of Search ............................. 165/41, 42, 51, 165/148, 149, 900; 180/68.1, 68.4, 68.6; 123/41.48, 41.49, 41.51

(56) References Cited

U.S. PATENT DOCUMENTS

| | | | | |
|---|---|---|---|---|
| 1,227,770 A | * | 5/1917 | Fleischmann | 165/149 |
| 1,747,868 A | * | 2/1930 | Guernsey | 123/41.51 |
| 2,756,026 A | * | 7/1956 | Myrent et al. | 165/41 X |
| 3,472,042 A | * | 10/1969 | Shriver et al. | 165/121 X |
| 3,635,285 A | * | 1/1972 | Davis | 123/41.49 X |
| 3,868,992 A | * | 3/1975 | Getz et al. | 165/51 |
| 3,921,603 A | * | 11/1975 | Bentz et al. | 165/51 X |
| 3,964,449 A | * | 6/1976 | Thien et al. | 123/41.51 |
| 4,034,804 A | * | 7/1977 | Meijer et al. | 165/149 X |
| 4,076,072 A | * | 2/1978 | Bentz | 165/41 |
| 4,116,265 A | * | 9/1978 | Staebler | 180/68.1 X |
| 4,202,296 A | * | 5/1980 | Nonnemann et al. | 123/41.48 |
| 4,657,070 A | * | 4/1987 | Kluppel | 165/900 X |
| 5,046,550 A | * | 9/1991 | Boll et al. | 123/41.49 X |
| 5,474,121 A | * | 12/1995 | Bryson et al. | 165/41 |
| 5,492,167 A | * | 2/1996 | Glesmann | 165/41 |

FOREIGN PATENT DOCUMENTS

| | | | | |
|---|---|---|---|---|
| GB | 114869 | * | 4/1918 | 123/41.51 |
| GB | 484831 | * | 5/1938 | 123/41.51 |
| JP | 61-77524 | * | 4/1986 | 180/68.1 |
| JP | 1-83126 | | 6/1989 | |
| JP | 2-74483 | * | 3/1990 | 180/68.1 |

\* cited by examiner

*Primary Examiner*—Ljiljana Ciric
(74) *Attorney, Agent, or Firm*—Varndell & Varndell, PLLC

(57) ABSTRACT

A cooling system that is capable of cooling a working vehicle, such as a wheeled loader, at a good efficiency and at a reduced level of noise. Plural radiators are arranged in a V-shaped form within a plane behind an engine mounted in the rear of the engine compartment of the vehicle. The radiators are spread a part rearwardly to form a space between them. A cooling fan is mounted in this space. The side surfaces of the radiators are provided with intake ports that are covered by openable side covers. The top of each intake ports is covered by a hood whose top surface can be tilted rearwardly and downwardly.

5 Claims, 8 Drawing Sheets

COOLING SYSTEM FOR WORKING VEHICLE

FIELD OF THE INVENTION

The present invention relates to a cooling system for a wheel type working vehicle having a working implement in the front and an engine in the rear.

DESCRIPTION OF THE PRIOR ART

FIG. 10 is a side elevation of a wheel type working vehicle. This working vehicle, generally indicated by reference numeral 1, has a vehicle body 2. A working implement 3 used for scooping and loading is mounted in the front of the vehicle body 2. An engine compartment 10 incorporating an engine 4 and a radiator 50 is disposed in the rear of the vehicle body 2. The engine compartment 10 consists of a hood 11, a pair of side covers 12 spaced from each other, and a radiator shutter 13. Each side cover 12 is provided with an intake port 14. The radiator shutter 13 is provided with exhaust ports 15.

FIGS. 11 and 12 are schematic plan views showing examples of the prior art working vehicle. In FIG. 11, a cooling fan 20 is positioned behind the engine 4. The radiator 50 is located behind the fan. The cooling fan 20 is directly driven by the engine 4. In FIG. 12, the radiator 50 is disposed behind the engine 4, and the cooling fan 20 is mounted behind the radiator 50. In this arrangement, the cooling fan 20 is driven either by a hydraulic motor or by an electric motor 21. Cooling air is sucked from the intake ports 14 in the right and left side covers 12 of the engine compartment 10 as indicated by the arrows. The air then passes through the radiator 50 and is discharged from the exhaust ports 15 of the radiator shutter 13. Another example is disclosed in Japanese Unexamined Utility Model No. 83126/1989.

The structures described above have the following problems. In the examples shown in FIGS. 11 and 12, the flow of the cooling air is indicated by the arrows. That is, the cooling air enters the radiator 50 after passing across the side surfaces of the engine 4. Therefore, the cooling air is prewarmed. Furthermore, the cooling airflow is not smooth because the engine 4 constitutes an obstacle. Hence, the cooling efficiency is not good. For this reason, the radiator 50 needs to have a large surface area. Furthermore, a large amount of airflow is necessary. Additionally, the rotational speed of the cooling fan 20 is high.

In recent years, noises have presented great social problems. Working vehicles have been required to produce reduced levels of noise. One method of reducing the noise level is to lower the rotational speed of the cooling fan 20. For this purpose, it is necessary to improve the cooling efficiency. One method of improving the cooling efficiency is to increase the cooling area of the radiator 50. One conceivable method of increasing the cooling area consists of increasing the height, width, or thickness of the radiator 50. Where the height or width is increased, however, the flow of air across the increased portion is poor. This will impair the efficiency of the cooling fan 20. Where the thickness is increased, the ventilation resistance is increased, and the cooling efficiency drops. Where the height of the radiator 50 is increased, the height H1 of the hood 11 of the engine compartment 10 shown in FIG. 1 increases, deteriorating the backward visibility. If the width is increased, the width of the vehicle is increased.

A wheel loader that is a wheel type working vehicle that usually performs the following operations. First, the loader scoops a hillock. Thereafter, the loader moves backward while the operator is steering the vehicle. Then, the vehicle advances to a location where the soil should be dumped. Therefore, if the backward visibility is deteriorated as mentioned above, it is difficult to drive the vehicle in the backward direction. If the width of the vehicle is increased, the vehicle more easily collides against an obstacle during steering or motion. As a result, the steering performance and the working performance are deteriorated.

In the structure described above, the engine 4, the radiator 50, and the cooling fan 20 are close to each other. The cooling fan 20 is fixed. Therefore, it is difficult to clean the front and rear surfaces of the radiator 50.

In the structure disclosed in the above-cited Japanese Unexamined Utility Model No. 83126/1989, the core of the radiator is split into two parts. One core part is tilted from the other. The cooling area can be increased without increasing the height or width of the vehicle body. However, tanks formed in the core parts are placed in communication with each other and made integral with each other. Consequently, the structure is made complex and expensive. Furthermore, when the radiator is replaced, the whole radiator must be replaced. Hence, it is costly to repair the cooling system.

SUMMARY OF THE INVENTION

In view of the foregoing problems, it is an object of the present invention to provide an inexpensive cooling system which is used to cool a working vehicle, secures a large cooling area within a limited space, produces a reduced level of noise, can offer improved backward visibility, and is easy to clean.

The above-described object is achieved by a first embodiment of the present invention that provides a cooling system for use with a wheel type working vehicle having a working implement in the front and an engine in the rear. The cooling system has a plurality of radiators mounted in the rear of the vehicle. The radiators are arranged like the letter "V" within a plane.

In the structure described above, the plural radiators are arranged like the letter "V" within a plane. Therefore a wider cooling area can be secured within the same width than where a single radiator is used. The rotational speed of the fan can be reduced. Consequently, a lower level of noise can be accomplished. Furthermore, air taken in across the side covers of the engine compartment flows smoothly and can be introduced without passing across the side surfaces of the engine. Hence, the cooling efficiency is improved. Especially in the case of large-sized vehicles, the cost can be reduced by using two small-sized radiators.

A second embodiment of the present invention is based on the first embodiment described above and characterized in that the plural radiators described above are arranged like the letter "V" in the rear of the engine. This V-shaped radiator arrangement has a space or an opening in the rear. A single cooling fan is mounted in the opening of the radiator arrangement.

In the structure described above, the radiators are arranged like the letter "V" having an opening in the rear and so the radiators are tilted from the side surface of the body. The single cooling fan is mounted in the opening of the V-shaped radiator arrangement. Therefore, air taken in across the side surfaces of the vehicle body flows smoothly. The cooling air passes across the whole surfaces of the radiators while experiencing less resistance. In consequence, the cooling efficiency is improved.

A third embodiment of the present invention is based on the second embodiment described above and characterized in that each of the side surfaces of the radiators described above has an intake port covered by a side cover that can be opened. The top side of the intake port is covered by the hood whose top surface is tilted rearwardly downwardly.

In the structure described above, the radiators are tilted from the side surfaces of the vehicle body. Therefore, the outer surfaces of the radiators can be inspected and cleaned easily by opening the side covers. Furthermore, the rearward visibility is improved, because the top surface of the hood is tilted rearwardly and downwardly. Hence, the vehicle can be driven easily and safely.

A fourth embodiment of the invention is based on the second or third embodiment described above and characterized in that the aforementioned cooling fan is tilted rearwardly and upwardly as viewed from a side.

In this structure, the cooling fan is tilted rearwardly upwardly and so the height at the rear end of the hood can be reduced. Hence, the rearward visibility can be enhanced.

A fifth embodiment of the invention is based on the second, third, or fourth embodiment described above and characterized in that the aforementioned cooling fan is rotatably mounted to a fan support frame. Any one of the left end, right end, top end, and bottom end of the fan support frame is rotatably held to the rear end of the opening of the radiator arrangement.

In the structure described above, any one of the left end, right end, top end, and bottom end of the fan support frame is rotatably held to the rear end of the opening of the radiator arrangement, so that the inner surfaces of the V-shaped arrangement of the radiators can be easily inspected and cleaned by swinging the fan support frame open. Accordingly, the maintainability of the radiators can be improved.

A sixth embodiment of the invention is based on the first or second embodiment described above and characterized in that two radiators form a V-shaped arrangement having an opening in the rear within a plane. The inner ends of the radiators are close to each other. The inner ends of the radiators are tightened to a bracket of L-shaped cross section with bolts such that the bracket fills the gap between the inner ends. A fan shroud that covers the outer periphery of the cooling fan is mounted to the outer ends of the radiators close to the opening. Top and bottom plates are mounted at the top and the bottom, respectively, in a triangular area surrounded by the two radiators and the fan shroud.

In the structure described above, the opening that is formed in the rear of the V-shaped radiator arrangement and located between the two radiators is covered by the bracket at the inner ends of the radiators, the fan shroud around the rear opening, the top plate, and the bottom plate. The cooling air passes across the whole surface of the radiator core without leakage. Therefore, cooling is done efficiently. Since the radiators are tightened to the bracket with the bolts, the radiators can be attached and detached independently. Consequently, only the radiator that needs to be serviced can be replaced. As a result, the repair cost can be curtailed. The replacement operation is facilitated. In consequence, the maintenance cost can be reduced.

Other objects and features of the invention will appear in the course of the description thereof, which follows.

DETAILED DESCRIPTION OF THE INVENTION

The preferred embodiments of the present invention applied to a cooling system for a working vehicle are hereinafter described in detail by referring to FIGS. 1–9.

Figure 1:
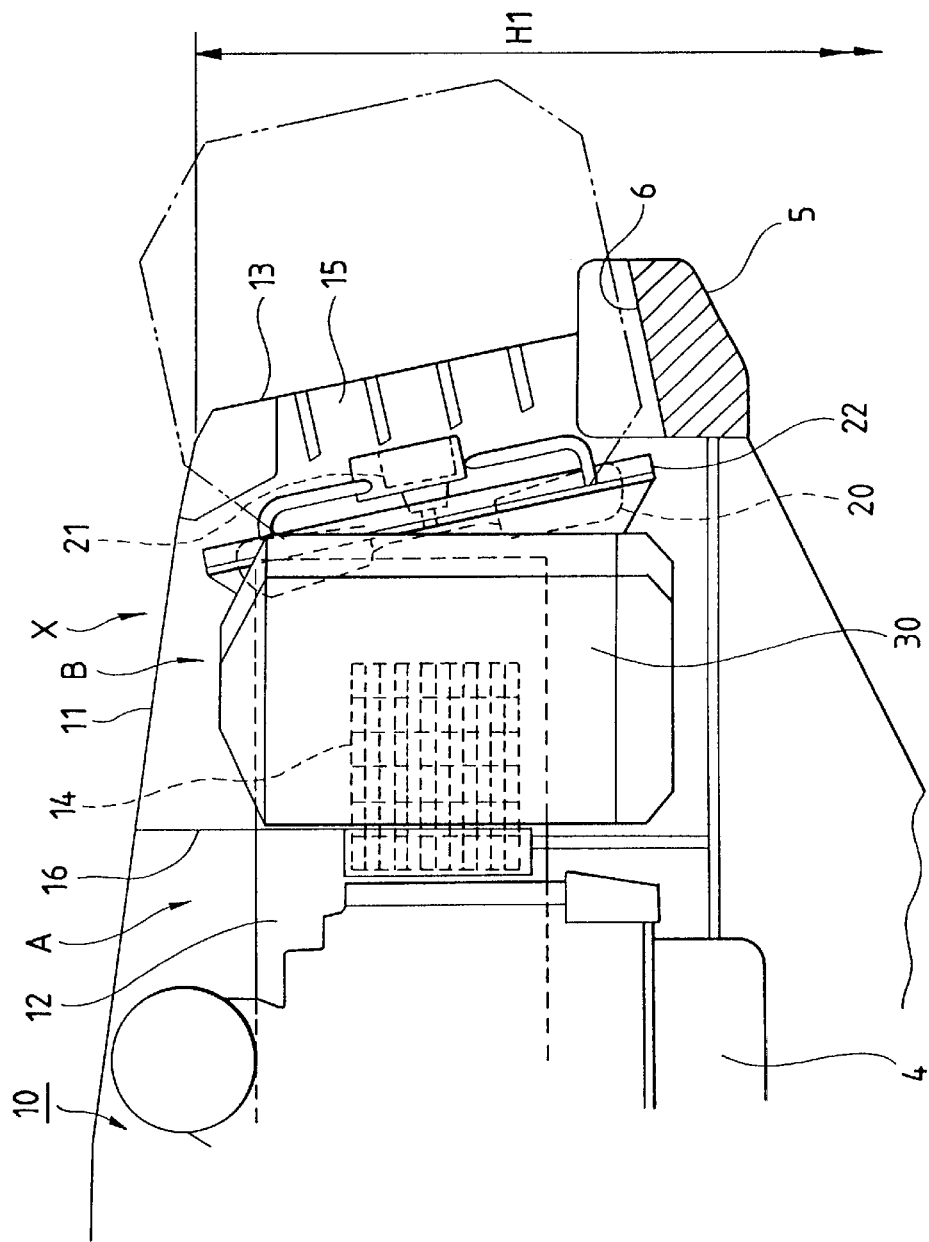
FIG. 1 is a side elevation in cross section of an engine compartment fitted with a cooling system in accordance with the present invention.
Figure 2:
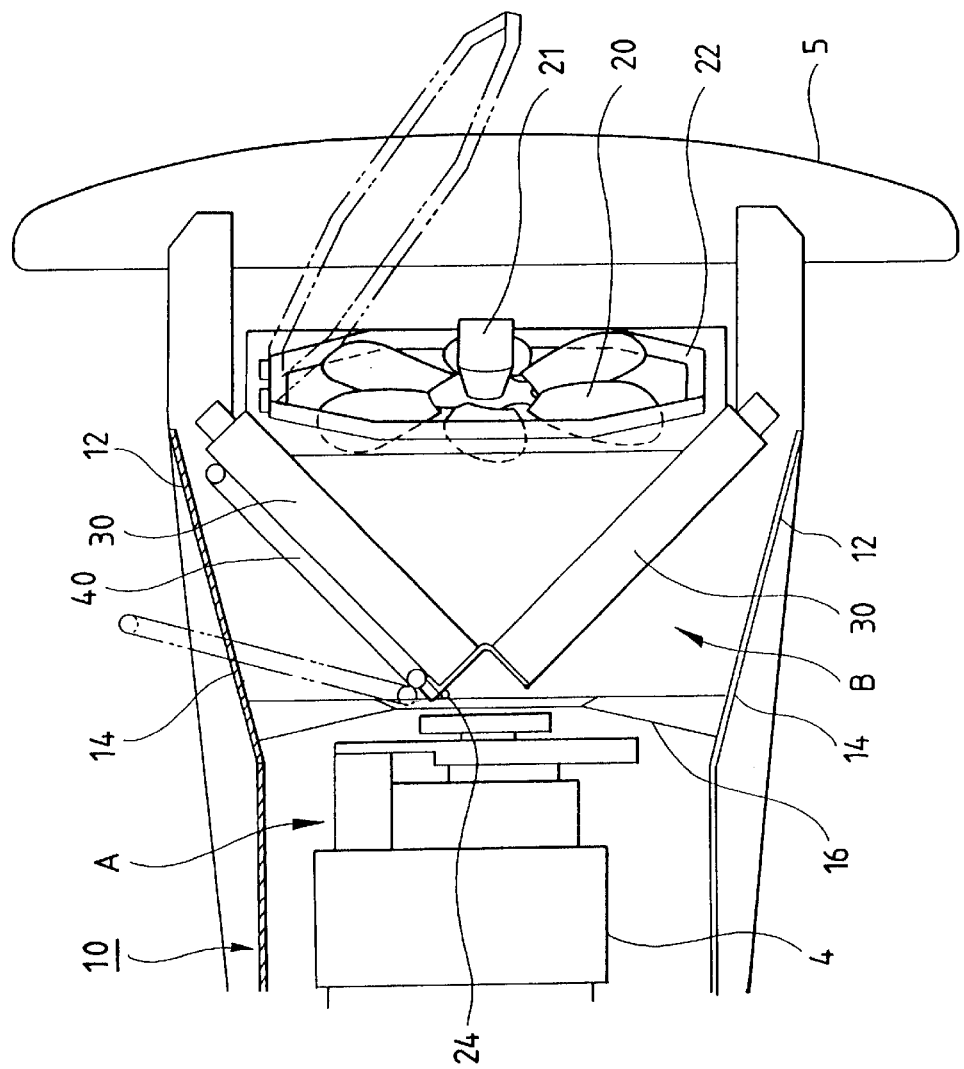
FIG. 2 is a plan view in cross section of an engine compartment fitted with a cooling system having radiators arranged in accordance with a first embodiment of the invention.

FIG. 1 is a side elevation in cross section of the engine compartment 10 of the vehicle. FIG. 2 is a plan view in cross section of the engine compartment 10, and in which radiators are arranged in accordance with a first embodiment of the invention.

In FIGS. 1 and 2, the engine compartment 10 comprises a hood 11, right and left side covers 12, and a radiator shutter 13. A partition wall 16 is formed in the rear of the engine 4. Two radiators 30 are disposed behind the partition wall 16 and arranged like the letter "V" within a plane. The radiators 30 are spread apart rearwardly to form an opening. A cooling fan 20 driven by an electric motor 21 is mounted in the opening between the radiators 30. In this way, the engine compartment 10 is divided into a chamber A accommodating the engine 4 and a chamber B accommodating the radiators 30 and the cooling fan 20. This cooling fan 20 is mounted in such a way that its rear surface is tilted upwardly. The side covers 12 at both sides of the chamber B are formed with intake ports 14, respectively. The radiator shutter 13 is provided with exhaust ports 15. The side covers 12 and the radiator shutter 13 are capable of being opened and closed.

Figure 3:
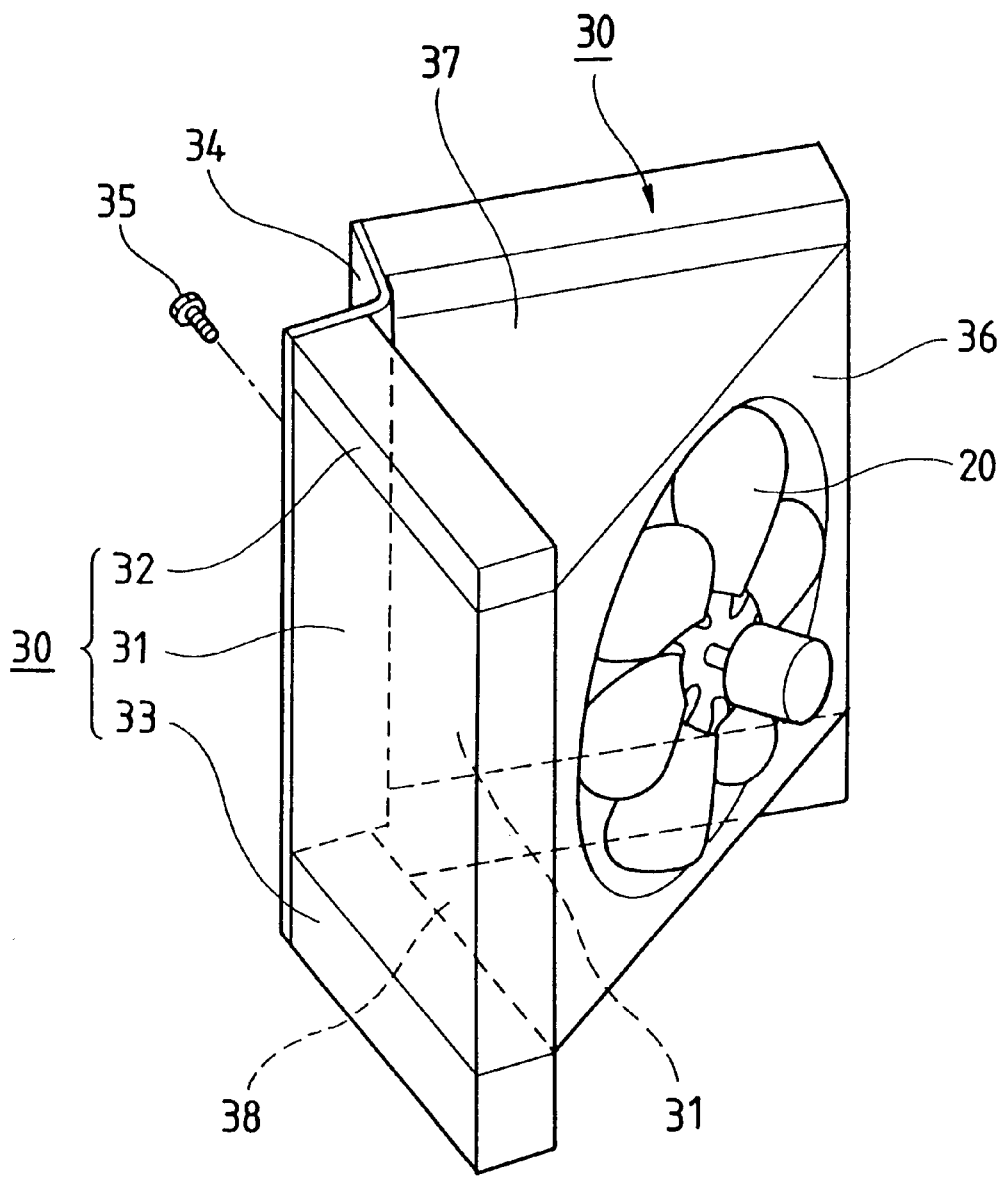
FIG. 3 is a perspective view of a radiator assembly in accordance with the present invention, and in which the radiator assembly comprises radiators and a cooling fan.

FIG. 3 is a perspective view showing the radiator assembly consisting of the radiators 30 and the cooling fan 20. Each radiator 30 comprises a radiator core 31, an upper tank 32, and a lower tank 33. The two radiators 30 have ends close to each other around the center of this radiator assembly. The other ends of the radiators are spaced from each other by about 90 degrees. Thus, the radiators assume a V-shaped arrangement. The inner ends of the radiators are detachably mounted to a bracket 34 of L-shaped cross section with bolts 35. No gap is left between these inner ends. A fan shroud 36 is mounted in the space between the radiator cores 31 at the outer ends of the radiators. The cooling fan 20 is mounted in the center of the fan shroud 36. A triangular top place 37 is mounted between the top sides of the radiator cores 31. A bottom plate 38 is mounted between the bottom sides of the radiator cores. Cooling air effectively passes through the radiator cores 31.

Figure 4:
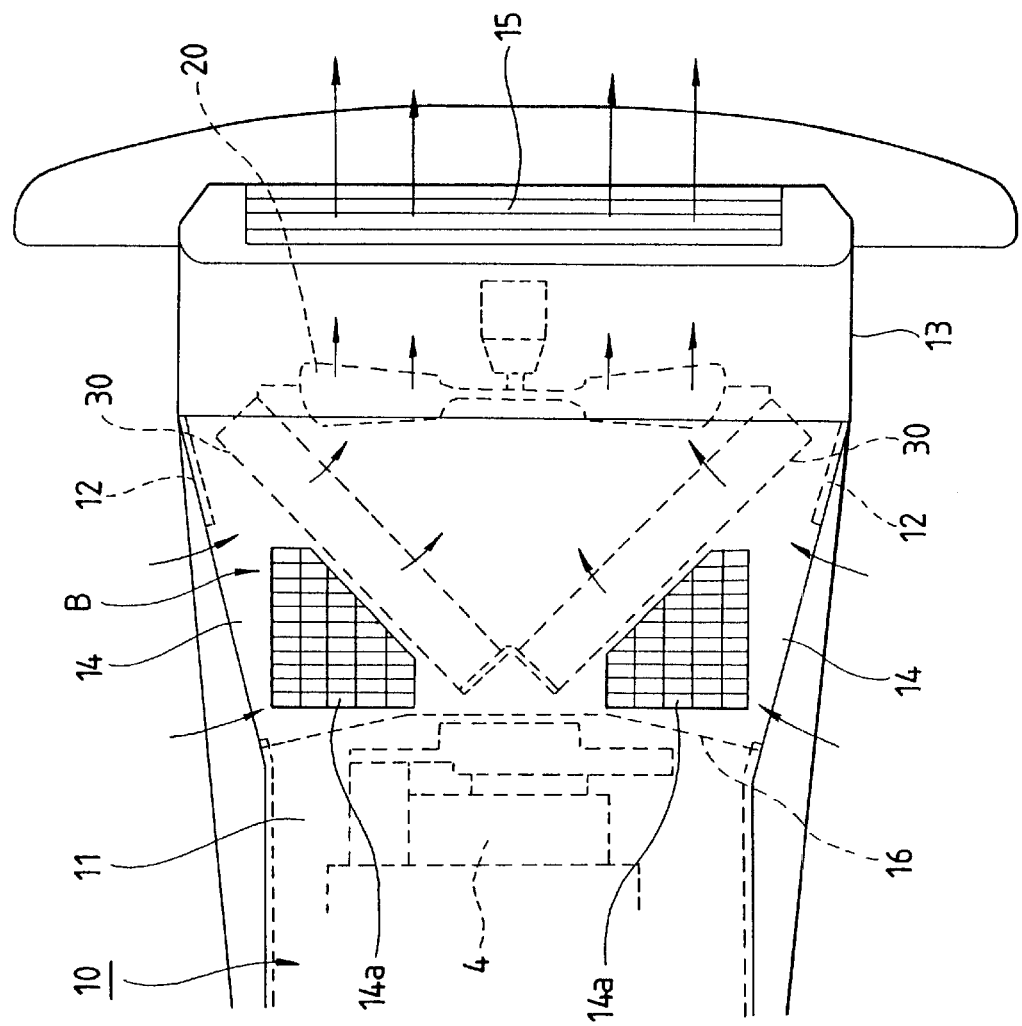
FIG. 4 is a plan view of an engine compartment fitted with a cooling system in accordance with the invention.

Cooling is done in the manner described below. Also, its advantages are described. FIG. 4 is a plan view of the engine compartment 10. A triangular area surrounded by the partition wall 16 and the front surface of one radiator 30 in the hood 11 is provided with an intake port 14a. Similarly, a triangular area defined by the partition wall 16 and the front surface of another radiator 30 in the hood 11 is provided with another intake port 14a. When the cooling fan 20 turns, outside air is drawn in from the intake ports 14 of the side covers 12 and from the intake ports 14a of the hood 11 as indicated by the arrows. The air then passes through the radiators 30 and is discharged from the exhaust ports 15 in the radiator shutter 13.

Figure 11:
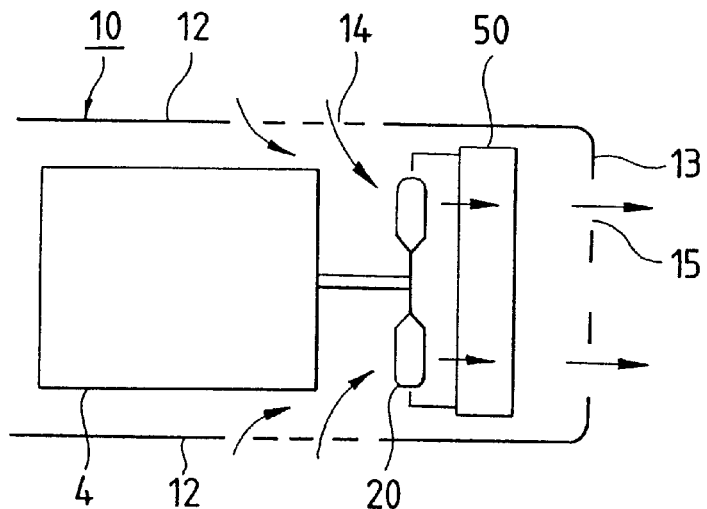
FIG. 11 is a plan view of an engine compartment showing one conventional cooling system.
Figure 12:
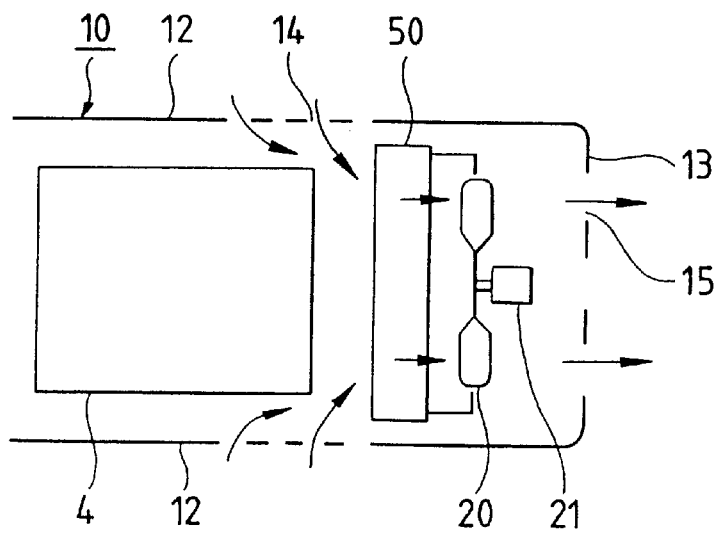
FIG. 12 is a plan view of an engine compartment showing another conventional cooling system.

Since the two radiators 30 are arranged in a V-shaped form, if they are mounted in the engine compartment 10 of the same width, the surface area of the radiator core 31 can be made much larger than that of the prior art radiator 50 described already in connection with FIG. 11. Consequently, the cooling area is increased. Furthermore, the chamber B is separated from the chamber A in which the engine 4 is mounted. Therefore, the engine 4 does not preheat the sucked in air.

In addition, outside air strikes the radiators 30 almost vertically, because the two radiators 30 are arranged like the letter V. The ventilation resistance decreases by an amount corresponding to the increase in the surface area. Consequently, the flow of air taken in from the side covers 12 is rendered smooth. This improves the cooling efficiency. As a result, the rotational frequency of the cooling fan 20 can be decreased greatly. Hence, the noise level can be reduced.

Improvement of the visibility is next described. Since the surface area of the radiator cores 31 can be increased as mentioned above, the height of the radiators 30 can be reduced. Furthermore, since the cooling fan 20 is mounted in such a way that its rear surface is tilted upwardly as described above, the height H1 at the rear end can be decreased by tilting the top surface of the hood 11 rearwardly downwardly as shown in FIG. 1. Accordingly, the visibility behind the working vehicle is improved.

Figure 5:
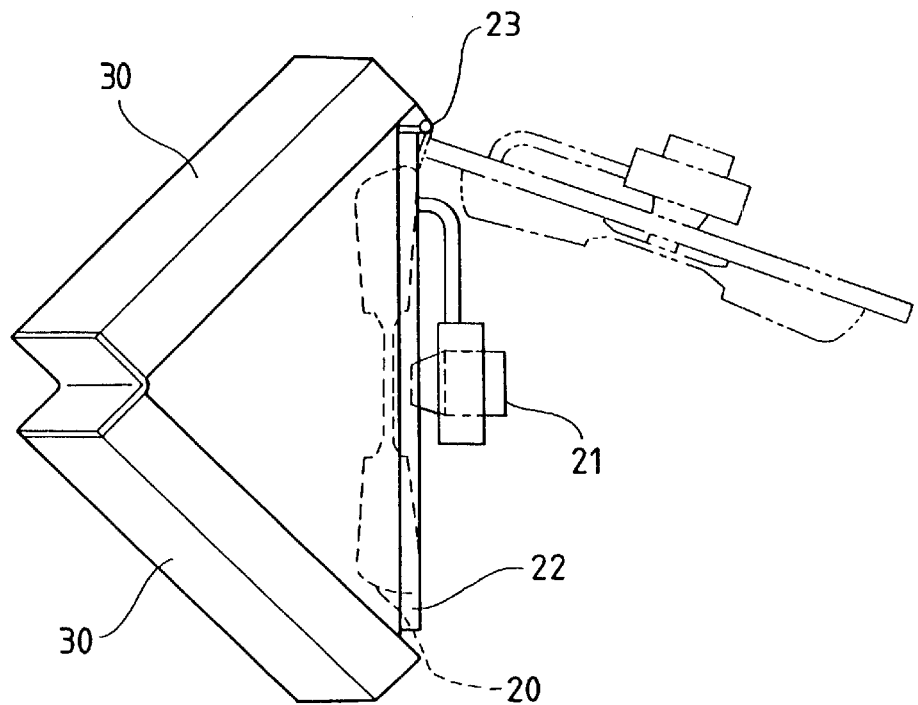
FIG. 5 is a perspective view taken in the direction represented by the letter X of FIG. 1.

The maintainability and economy are next described. FIG. 5 perspective view taken in the direction represented by the letter X of FIG. 1. The cooling fan 20 and the motor 21 are mounted to the fan support frame 22. One of the right and left ends of the fan support frame 22 is rotatably mounted to one end of the corresponding radiator 30 via a pin 23. Therefore, the radiator shutter 13 can be swung open, and the fan support frame 22 can be swung open about the pin 23 as indicated by the phantom lines. Under this condition, the opening in the radiator assembly, i.e., the space between the radiators 30, can be easily cleaned. Note that the center of rotation of the fan support frame 22 is not limited to the left end or right end. For example, either the top end or the bottom end may be rotatably mounted to the corresponding radiator 30, the top plate or piece 37, or the bottom plate or piece 38 via a pin.

When the fan support frame 22 is swung open, it is brought to the position indicated by the phantom line in FIG. 1. Since the rear surface of the cooling fan 20 is tilted upwardly, the portions that interfere with a counterweight 5 when rotating the fan support frame 22 can be minimized. Therefore, a cutout 6 in the counterweight 5 can be decreased. Desired weight of the counterweight 5 can be secured. Where the fan support frame 22 does not interfere with the counterweight 5 when the frame is swung open or interferes with it only slightly, the cooling fan 20 may be placed vertical without tilting it.

In FIG. 2, the two radiators 30 are arranged in a V-shaped form. Thus, the outer surfaces, or the front sides, of the radiators 30 can be easily cleaned by swinging the side covers 12 open.

Referring also to FIG. 2, an oil cooler 40 is rotatably mounted to the front side of one radiator 30 via a hinge 24. The inner and outer surfaces of the oil cooler 40 and the outer surface of this radiator 30 can be cleaned easily by swinging the oil cooler 40 about the hinge 24 to the position indicated by the phantom line. In this way, improved maintainability is offered.

Since the two radiators 30 are arranged in a V-shaped form, small-sized radiators can be used. Hence, the cooling system is economical to fabricate. As shown in FIG. 3, the radiators 30 are tightened to the bracket 34 via the bolts 35 and so the radiators can be separately mounted and detached. Consequently, only one of the radiators can be replaced. The repair cost can be reduced. Moreover, the radiator assembly is small in size and easy to handle. In this way, improved maintainability is provided.

Figure 6:
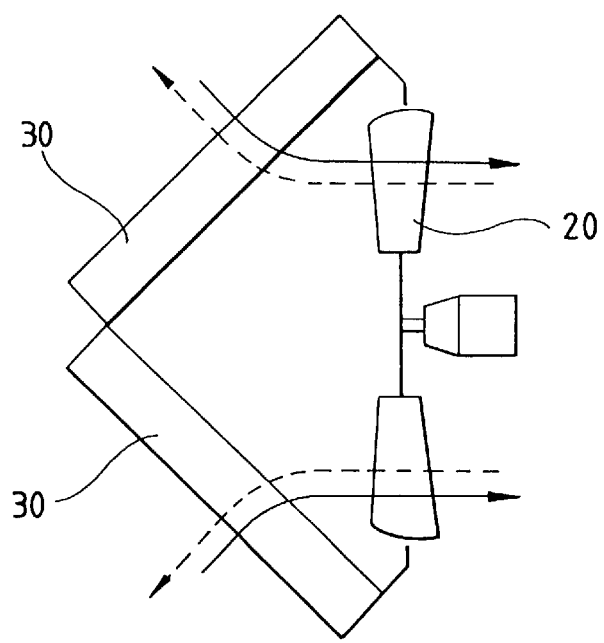
FIG. 6 is a view illustrating the flow of cooling air across a cooling system.

Another embodiment of the invention is next described. FIG. 6 is a plan view showing the direction of flow of cooling air. In the embodiment described above, cooling air flows from the radiators 30 toward the cooling fan 20 as indicated by the arrows of the sold lines. Alternatively, cooling air may be made to flow from the cooling fan 20 toward the radiators 30 as indicated by the arrows of the broken lines.

Figure 7:
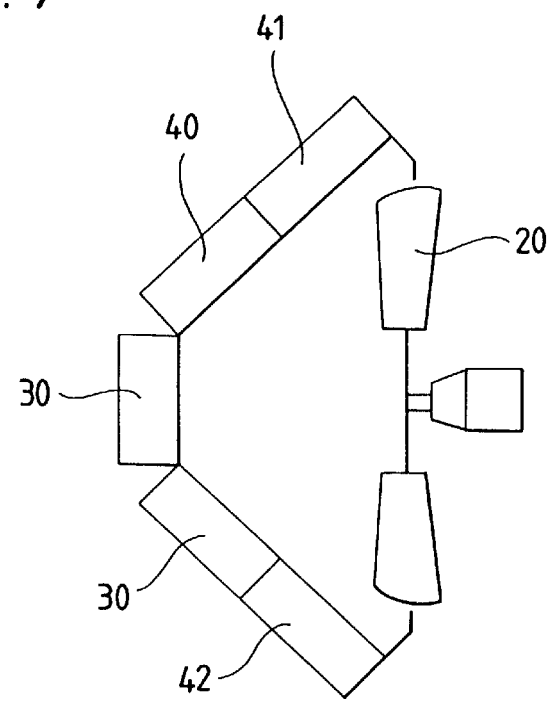
FIG. 7 is a plan view showing a radiator arrangement in accordance with a second embodiment of the invention.

FIG. 7 is a plan view showing a radiator arrangement in accordance with the second embodiment. Various heat-dissipating devices are arranged in a V-shaped form. An engine aftercooler 41, an oil cooler 40, a radiator 30 on the front side, another radiator 30 on the left front side, and an air-conditioner capacitor 42 are mounted in this order from the right side in the figure. The capacitor 42 is located alongside the radiator 30 on the left front side. Thus, the heat-dissipating devices can dissipate heat efficiently.

It is to be understood that the arrangement of the heat-dissipating devices is not limited to the illustrated arrangement. It is only necessary that they be arranged in a V-shaped form. For instance, a baffle plate may be placed instead of the front radiator 30 shown in FIG. 7, and various heat-dissipating devices may be arranged on both sides of the baffle plate.

Figure 8:
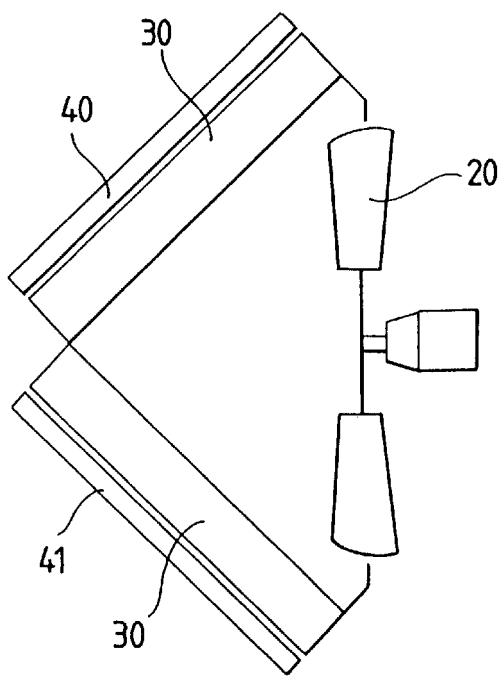
FIG. 8 is a plan view showing a radiator arrangement in accordance with a third embodiment of the invention.

FIG. 8 is a plan view of a radiator arrangement in accordance with a third embodiment of the invention. Two radiators 30 are arranged in a V-shaped form. An oil cooler 40 is mounted on the outside of one radiator 30. An engine aftercooler 41 is mounted on the outside of the other radiator 30. Consequently, the various heat-dissipating devices can dissipate heat efficiently in the same way as the arrangement described above.

Figure 9:
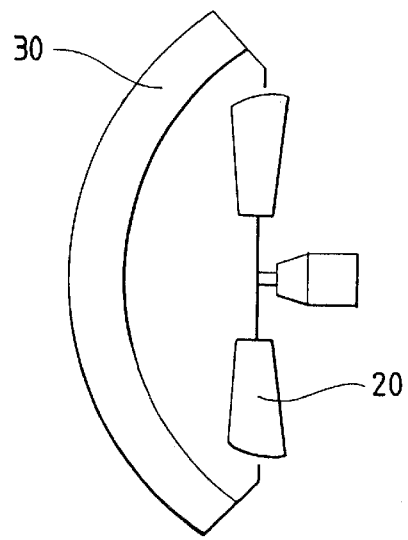
FIG. 9 is a plan view showing a radiator arrangement in accordance with a fourth embodiment of the invention.
Figure 10:
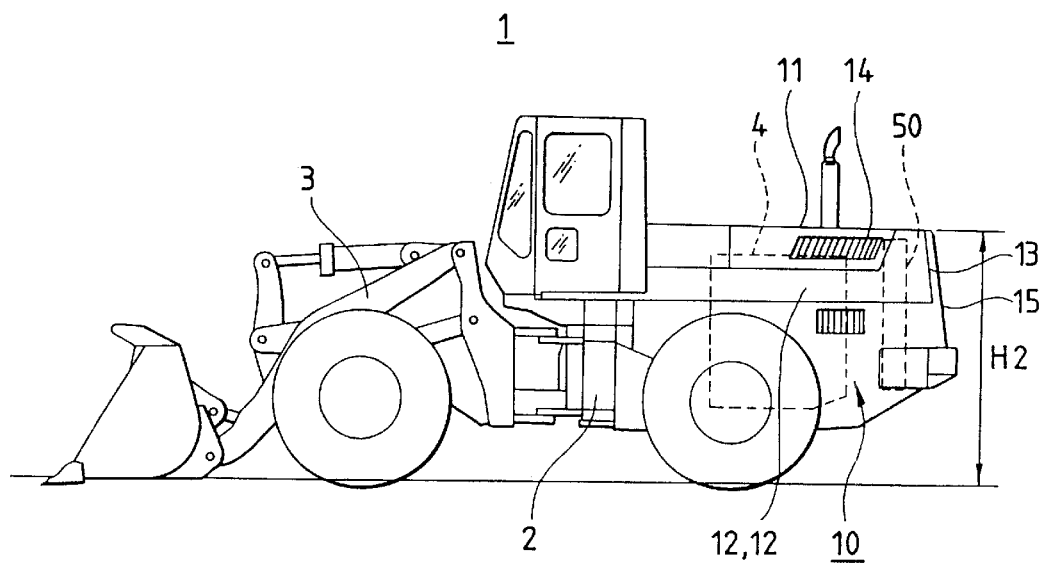
FIG. 10 is a side elevation of a wheel type working vehicle.

FIG. 9 is a plan view of a radiator arrangement in accordance with a fourth embodiment of the invention. This radiator arrangement consists of one radiator 30 shaped into an arc. A larger cooling area can be secured for the same width.

What is claimed is:

1. A cooling system in a wheeled working vehicle having a working implement in a front portion and an engine in a rear portion of the vehicle, said cooling system comprising two radiators per each cooling fan, each of said two radiators respectively having a rectangular shape with a front edge, a rear edge, a top edge and a bottom edge; said respective front edges of said two radiators being joined, and said respective rear edges of said two radiators being arranged to have a distance therebetween so that said top edges of said two radiators form a V-shaped structure, said V-shaped structure being arranged behind said engine and including a top triangular piece extending between said top edges of said two radiators, a bottom triangular piece extending between said bottom edges of said two radiators, and a fan shroud housing said cooling fan, said fan shroud extending between said rear edges of said two radiators and between said top and bottom triangular pieces.

2. The cooling system of claim 1, wherein side surfaces of said radiators are provided with intake ports that are covered by openable side covers, and top sides of said intake ports are covered by a hood having a top surface tilted rearwardly and downwardly.

3. The cooling system of claim 1, wherein said cooling system provides a reduced height for improving operator visibility behind said vehicle by reducing the height of said two radiators and tilting said fan.

4. The cooling system of claim 1, wherein said cooling fan has one end pivoted to one of said two radiators for permitting easy opening of said V-shaped structure and cleaning of said fan and said two radiators.

5. The cooling system of claim 1, wherein the inner ends of said radiators are tightened via bolts to a bracket of L-shaped cross section filling a gap between said inner ends.

\* \* \* \* \*